(12) United States Patent
Chang et al.

(10) Patent No.: US 7,897,718 B2
(45) Date of Patent: Mar. 1, 2011

(54) ACRYLATED SEMI-CRYSTALLINE HYPERBRANCHED POLYURETHANE OLIGOMER AND PREPARATION METHOD THEREOF

(75) Inventors: Chi-Kang Chang, Kaohsiung (TW); Chin-Yuan Chen, Kaohsiung (TW); Wen-Fang Shi, Kaohsiung (TW); Hong-Bo Liang, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 984 days.

(21) Appl. No.: 11/436,713

(22) Filed: May 18, 2006

(65) Prior Publication Data

US 2006/0264598 A1    Nov. 23, 2006

(30) Foreign Application Priority Data

May 19, 2005   (TW) ................ 94116359 A

(51) Int. Cl.
*C08G 18/67* (2006.01)
*C08G 18/04* (2006.01)
*C08G 18/30* (2006.01)

(52) U.S. Cl. .......... 528/49; 252/182.18; 252/182.23; 525/454; 525/455; 528/69; 528/75; 560/25; 560/26; 560/115; 560/158

(58) Field of Classification Search .......... 528/69, 528/75, 49; 560/25, 26, 115, 158; 252/182.23, 252/182.18; 525/454, 455

See application file for complete search history.

(56) References Cited

U.S. PATENT DOCUMENTS

| | | | | | |
|---|---|---|---|---|---|
| 5,183,862 | A | * | 2/1993 | Figuly | 525/437 |
| 5,789,039 | A | * | 8/1998 | Biller et al. | 427/508 |
| 5,935,661 | A | * | 8/1999 | Biller et al. | 427/474 |
| 6,114,489 | A | * | 9/2000 | Vicari et al. | 528/84 |
| 7,186,771 | B2 | * | 3/2007 | Haggman et al. | 524/500 |
| 7,361,715 | B2 | * | 4/2008 | Retsch et al. | 525/420 |
| 2002/0099127 | A1 | * | 7/2002 | Wenning et al. | 524/451 |
| 2003/0130372 | A1 | * | 7/2003 | Wenning et al. | 522/173 |

FOREIGN PATENT DOCUMENTS

EP           630389        * 12/1994

* cited by examiner

*Primary Examiner* — Rabon Sergent
(74) *Attorney, Agent, or Firm* — Todd E. Garabedian; Wiggin and Dana LLP

(57) ABSTRACT

The present invention relates to an acrylated semi-crystalline hyperbranched polyurethane oligomer and a preparation method thereof, which is characterized in that on the basis of the synthesis of hyperbranched polyurethane oligomer, it adopts a two-step process to make modifications to form a methacrylic and/or acrylic double bond and a long carbon chain with a carbon atom number higher than 10 or a benzene ring or a naphthalene ring at the terminals. The obtained oligomer has a lower melting point and a higher glass transition temperature and can be cured by means of radiation, and the curing rate is high enough to effectively improve production efficiency and save energy to form a cured film having a higher hardness and excellent thermal stability. The raw materials used in the method of the invention are easily obtained, and the method is suitable for large-scale production in industry.

11 Claims, 1 Drawing Sheet

ACRYLATED SEMI-CRYSTALLINE HYPERBRANCHED POLYURETHANE OLIGOMER AND PREPARATION METHOD THEREOF

BACKGROUND OF THE INVENTION

1. Field of the Invention

The present invention relates to a radiation-curable acrylated semi-crystalline hyperbranched polyurethane oligomer and a preparation method thereof.

2. Description of the Prior Art

Powder coatings have been developed rapidly in recent years because of several advantages such as being solvent-free, having no volatile organic compound emissions, and having recyclable fallen wastes, a high availability of raw materials and ease of operation. Traditional thermosetting powder coatings typically, however, need to be cured for 15 to 30 minutes at 160 to 180° C., which causes the thermal deformation of most plastic substrates, while discoloration and scars may also occur at wood substrates due to such a high curing temperature. The thermosetting powder coatings will be required to have much higher reactivity if the curing temperature of the coatings is to be decreased, thereby resulting in the problem of chemical instability in storage and transport. Therefore, conventional thermal-set powder coatings are only suitable for metal substrates. Compared to the thermosetting powder coatings, the melting and curing of radiation-curable powder coatings are two separate processes, i.e., powder particles are firstly melted and levelled at about 100° C. with infrared radiation, then irradiation cured, and thus a flat and smooth film surface is obtained. Moreover, as radiation-curable powder coatings are cured rapidly at low temperature so that energy is efficiently saved, they are applicable in a wide range of substrates, especially thermal-sensitive substrates. Thus, it has been the tendency in the field of coatings to study and develop an oligomer useful in radiation-curable powder coatings.

U.S. Pat. Nos. 5,789,039 and 5,935,661 disclose the use of a radiation-curable, especially ultraviolet-curable, solid oligomer system in powder coatings, which is mainly composed of cationic-cured resins, especially epoxy resins, including bisphenol A and aliphatic-type (including the types of hydrogenated bisphenol A, methacrylic diglycidyl ether and acrylic diglycidyl ether) epoxy resins. Other auxiliaries need to be added in such oligomers to achieve levelling at about 100° C., so that the oligomers can be applied onto thermal-sensitive substrates.

U.S. Pub. Pat. Nos. 2002/0099127 A1 and 2003/0130372 A1 disclose the use of a radiation-curable, especially ultraviolet-curable, solid oligomer in powder coatings, which mainly comprises two components: 60 to 90 wt % of amorphous polyurethane acrylate, and 10 to 40 wt % of crystalline polyurethane acrylate, the mixture of both having a glass transition temperature ($T_g$) of at least 35° C. The amorphous polyurethane acrylate is prepared by the reaction of hydroxy-terminated polyester ($T_g$=35 to 80° C.) and polyisocyanate, followed by the end-capping of the acrylates. The crystalline polyurethane acrylate is prepared by the reaction of crystalline hydroxy-terminated polyester and polyisocyanate, followed by the end-capping of the acrylates. The crystalline hydroxy-terminated polyester is prepared by the reaction of a long chain diacid and a long chain diol. The radiation-curable oligomers disclosed in these two patents are linear amorphous polymers with a high glass transition temperature, and have a high melt viscosity, where viscosity decreases very slowly at a temperature higher than $T_g$ so that it is difficult to level. Moreover, the oligomers have a low radiation-curing rate due to their lower functionality.

Chinese Patent ZL 00119066.0 discloses a radiation-curable, especially ultraviolet-curable, acrylated semi-crystalline dendritic polyether amide oligomer, but the synthesis of the dendritic polymer is complicated and expensive, thereby limiting its application.

Macro molecules (Vol. 36, p. 613-620, 2003) discloses a synthesis method of hyperbranched polyurethane, but the hyperbranched polyurethane obtained by this method is an amorphous polymer, with no methacrylate or acrylate functionality and no long carbon chain or benzene ring or naphthalene ring at the terminals, and thus, it cannot be cured by a radiation method.

SUMMARY OF THE INVENTION

The main object of the subject invention is to provide a radiation-curable acrylated semi-crystalline hyperbranched polyurethane oligomer so as to overcome the above-mentioned disadvantages of the prior art.

Another object of the subject invention is to provide a preparation method of the acrylated semi-crystalline hyperbranched polyurethane oligomer, comprising forming a hydroxy-terminated hyperbranched polyurethane and then making a modification with a two-step process to form a methacrylic and/or acrylic double bond and a long carbon chain with a carbon atom number higher than 10 or a benzene ring or a naphthalene ring at the terminals.

DETAILED DESCRIPTION OF THE INVENTION

Figure 1:
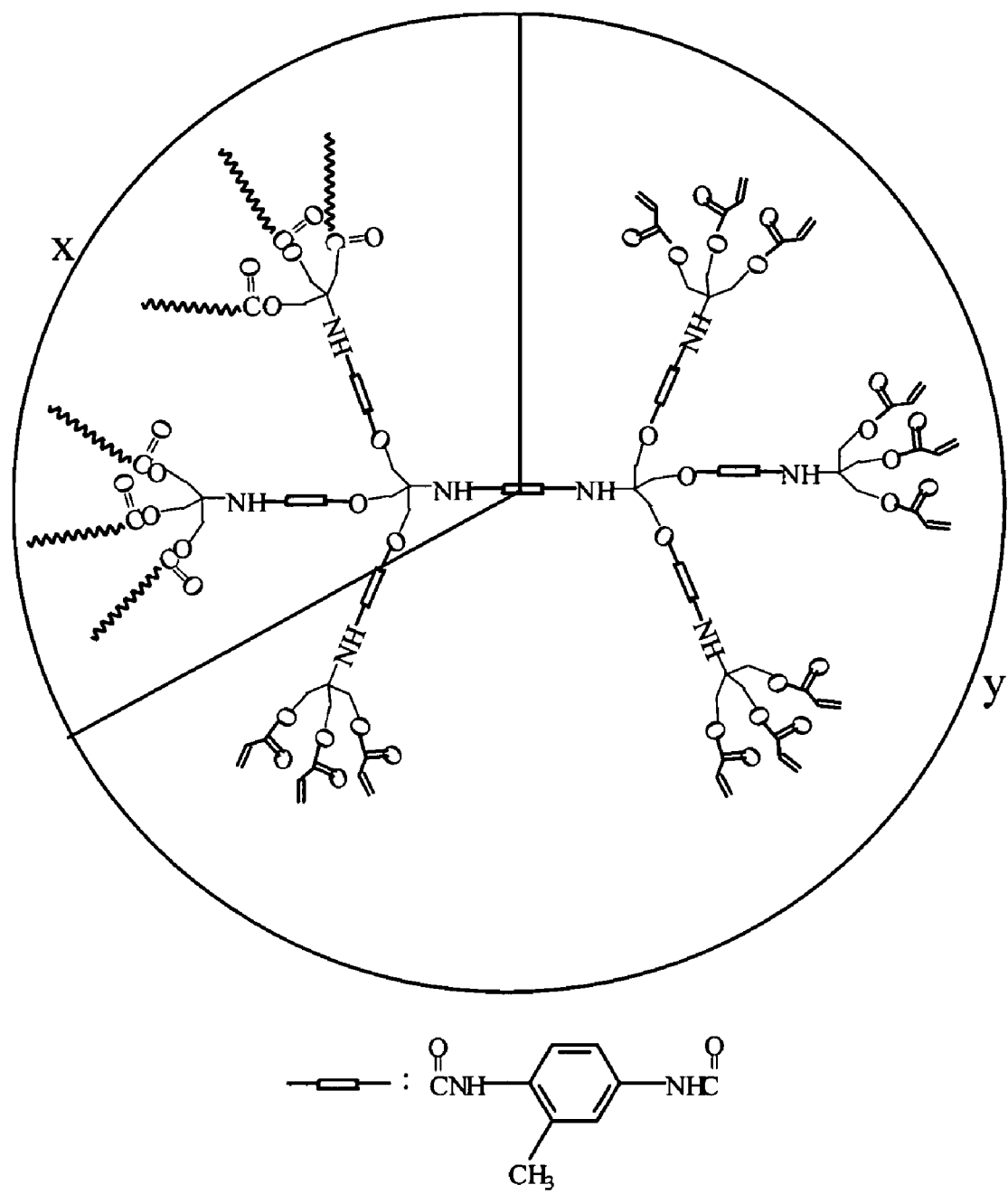
FIG. 1 is an ideal schematic diagram of the acrylated hyperbranched polyurethane oligomer of Example 3 provided herein.

In this invention, the method of forming the hydroxy-terminated hyperbranched polyurethane comprises the following steps: a $bB_n$-type polyhydroxyamine monomer is dissolved in a solvent, an $A_2$-type difunctional isocyanate monomer, is added at about −5° C. to about 10° C., and the reaction is maintained at about −5° C. to about 10° C. for about 1 hour to about 15 hours, and then a catalyst is added, the reaction mixture is heated to about 50° C. to about 90° C. for about 12 hours to about 48 hours, and then the reaction is precipitated, filtered, and dried to obtain the hydroxy-terminated hyperbranched polyurethane.

The solvent used in the above method is, for example, but is not limited to, dimethyl sulfoxide, N,N-dimethylformamide, N,N-dimethyl acetamide, toluene, dioxane, ethyl acetate, N-methylpyrrolidinone, butanone, xylene, or tetrahydrofuran.

The $bB_n$-type polyhydroxyamine monomer used in the above method has the chemical formula $R_1(H)NR_2(R_3OH)n$, wherein $R_1$, $R_2$ and $R_3$ are independently H or an alkyl containing 1 to 12 carbons or phenyl or naphthyl, and n is an integer greater than 1. The polyhydroxyamine can be a polyhydroxy-substituted monoamine or diamine, including diethanolamine, dipropanolamine, dibutanolamine, dipentanolamine, N,N-dihydroxyphenylethyl-3-amine, dihydroxymethylaminoethane, trihydroxymethylaminomethane, N-methyl-d-glucosamine, or diisopropyl amine.

The $A_2$-type difunctional isocyanate monomer used in the above method includes tolylene diisocyanate, hexamethylene diisocyanate, diphenylmethylene diisocyanate, or isophorone diisocyanate.

The catalyst used in the above method is, for example, but is not limited to, p-toluene sulfonic acid, sulfuric acid, nitrobenzene, metallic tin compound including stannic chloride, stannous chloride, dibutyl stannous oxide, dibutyl tin laurate, or stannous octoate, or a tertiary amine including triethylamine, dimethylaniline, dimethyl benzylamine, dimethylaminopyridine, or dimethylethanolamine, the amount of which is about 0.5 wt % to about 2 wt %.

Subsequently, the above-obtained hydroxy-terminated hyperbranched polyurethane is modified in a two-step process, which comprises forming a long carbon chain with a carbon atom number higher than 10 or a benzene ring or a naphthalene ring at the terminals to obtain a semi-crystalline intermediate, and then modifying the residual hydroxyl terminal groups with methacrylic and/or acrylic double bonds to form a radiation-curable semi-crystalline hyperbranched polyurethane oligomer.

In a preferred embodiment of the invention, the two-step process comprises the first step of dissolving a hydroxy-terminated hyperbranched polyurethane in a solvent, and slowly adding, with stirring, a compound (I) containing a functional group reactive with hydroxyl and a long carbon chain having a carbon atom number higher than 10 (preferably 10 to 18) or a benzene ring or a naphthalene ring in a certain proportion, and reacting them at about 30° C. to about 120° C. for about 8 hours to about 48 hours in the presence of a catalyst; and the second step of dissolving the resultant product in a solvent, and slowly, dropwise adding, with stirring, an unsaturated capping compound (II) containing a functional group reactive with hydroxyl in a molar amount equivalent to that of the residual hydroxyl from the first reaction step, and reacting them at about 30° C. to about 120° C. for about 2 hours to about 20 hours in the presence of a catalyst and a polymerization inhibitor, and then washing with water to remove by-products.

The "certain proportion" involved in the above method refers to the molar reaction ratio of the compound (I) with a long carbon chain or a benzene ring or a naphthalene ring to the hyperbranched hydroxyl terminal groups, and is represented by the value meeting the inequation $0<X<1$.

Examples of the compound (I) containing a functional group reactive with hydroxyl and a long carbon chain having a carbon atom number higher than 10 or a benzene ring or a naphthalene ring used in the above method include, but are not limited to, monoacyl chloride, monoisocyanate, or monocarboxylic acid, among which, the chemical formula of the monoacyl chloride is RCOCl, wherein R is an alkyl containing more than 10 carbons or phenyl or naphthyl, such as undecanoyl chloride, dodecanoyl chloride, tetradecanoyl chloride, hexadecanoyl chloride, or benzoyl chloride; the chemical formula of the monoisocyanate is RNCO, wherein R is an alkyl containing more than 10 carbons or phenyl or naphthyl, such as undecyl isocyanate, dodecyl isocyanate, tetradecyl isocyanate, hexadecyl isocyanate, octadecyl isocyanate, or phenyl isocyanate; and the chemical formula of the monocarboxylic acid is RCOOH, wherein R is an alkyl containing more than 10 carbons or phenyl or naphthyl, such as undecanoic acid, palmitic acid, stearic acid, or benzoic acid.

The unsaturated capping compound (II) containing a functional group reactive with hydroxyl used in the above method includes unsaturated monocarboxylic anhydride, unsaturated monocarboxylic acid, unsaturated acyl chloride, or unsaturated isocyanate, among which, the unsaturated monocarboxylic anhydride includes acrylic anhydride or methacrylic anhydride; the unsaturated monocarboxylic acid includes acrylic acid or methacrylic acid; the unsaturated acyl chloride includes acryloyl chloride or methacryloyl chloride; and the unsaturated isocyanate includes methylstyrene isocyanate, ethyl methacrylate isocyanate, or an unsaturated isocyanate prepared by the reaction of a saturated diisocyanate and an unsaturated monohydroxyl compound, wherein the saturated diisocyanate includes tolylene diisocyanate, hexamethylene diisocyanate, diphenylmethylene diisocyanate, or isophorone diisocyanate, and the unsaturated monohydroxyl compound includes β-hydroxyethyl acrylate, β-hydroxyethyl methacrylate, or tridecenyl alcohol.

The catalyst used in the above method is, for example, but not limited to, p-toluene sulfonic acid, sulfuric acid, nitrobenzene, metallic tin compound including stannic chloride, stannous chloride, dibutyl stannous oxide, dibutyl tin laurate, or stannous octoate, or a tertiary amine including triethylamine, dimethylaniline, dimethyl benzylamine, dimethylaminopyridine, or dimethylethanolamine, the amount of which is about 0.5 wt % to about 2 wt %.

The polymerization inhibitor used in the above method is, for example, but not limited to, p-hydroxyanisole, or hydroquinone, the amount of which is about 500 ppm to about 4000 ppm.

The solvent used in the above method is, for example, but not limited to, dimethyl sulfoxide, N,N-dimethylformamide, N,N-dimethyl acetamide, toluene, dioxane, ethyl acetate, N-methylpyrrolidinone, butanone, xylene, or tetrahydrofuran.

In the two-step process, if an anhydride, acyl chloride or isocyanate having a long carbon chain with a carbon atom number higher than 10 or a benzene ring or a naphthalene ring is used for the modification in the first reaction step, preferably, the reaction temperature is about 20° C. to about 60° C. and the reaction time is about 18 hours to about 48 hours; and if a monocarboxylic acid is used for the modification, preferably, the reaction temperature is about 80° C. to about 140° C. and the reaction time is about 8 hours to about 20 hours.

In the second reaction step, if an unsaturated anhydride, unsaturated acyl chloride, or unsaturated isocyanate is used for the modification, preferably, the reaction temperature is about 20° C. to about 60° C. and the reaction time is about 18 hours to about 48 hours; and if an unsaturated monocarboxylic acid is used for the modification, preferably, the reaction temperature is about 80° C. to about 140° C. and the reaction time is about 8 hours to about 20 hours.

The invention further provides a radiation-curable semi-crystalline hyperbranched polyurethane oligomer, especially an acrylated semi-crystalline hyperbranched polyurethane oligomer, based on the synthesis of the hyperbranched polyurethane which is modified by a two-step process with methacrylate and/or acrylate acid and a long carbon chain or a benzene ring or a naphthalene ring, to form a methacrylate and/or acrylate double bond and a long carbon chain with a carbon atom number higher than 10 or a benzene ring or a naphthalene ring at the terminals.

Since the hyperbranched polyurethane synthesized in the invention is a highly branched polymer, and there is less intermolecular chain entanglement, as compared with the linear polymers disclosed in U.S. Pat. No. 5,935,661, U.S. Pat. No. 5,789,039, U.S. 2002/0099127 A1, and U.S. 2003/0130372 A1, the viscosity of the polyurethane of the invention decreases faster when the temperature is higher than its melting point. Therefore, the acrylated curable semi-crystalline hyperbranched polyurethane oligomer of the invention is more favorable for levelling, to allow the spray-coating operation to be easier, and the surface of the cured film obtained by radiation curing is flatter and smoother.

Moreover, since the hyperbranched polyurethane synthesized in the invention has more hydroxy terminal groups, and after modification it will have more active double bonds, as compared with the linear polymers disclosed in U.S. Pat. No. 5,935,661, U.S. Pat. No. 5,789,039, U.S. 2002/0099127 A1, and U.S. 2003/0130372 A1, when used as an oligomer, the inventive hyperbranched polyurethane can be cured by radiation at a high curing rate, so as to effectively improve production efficiency and save energy, which makes the inventive polyurethane suitable for large-scale production in industry.

Further more, as compared with the Chinese Patent ZL 00119066.0, in the synthesis route employed for the synthesis of the hyperbranched polyurethane oligomer according to the invention, the raw materials are obtainable more easily or the preparation thereof is more convenient, which makes it suitable for large-scale production in industry.

The following working examples will further illustrate the preparation method, crystalline property and radiation-curing and film properties associated with the inventive radiation-curable hyperbranched polyurethane oligomer, but are not intended to limit the scope of the invention, and all modifications and variations that can be made by persons skilled in the art, without departing from the spirit of the invention, are within the scope of the invention.

EXAMPLE 1

Preparation of Hydroxy-Terminated Hyperbranched Polyurethane

To a 250 ml three-neck reaction flask equipped with a magnetic stirrer in an ice bath were added 19.38 g (0.14 mol) trihydroxymethylaminomethane and 100 ml N,N-dimethyl acetamide, and then with continuous stirring, 24.38 g (0.16 mol) tolylene diisocyanate was slowly, dropwise added. The reaction was conducted for 4 hours, heated to 70° C., and then 1.0 wt % dibutyl tin laurate was added and reacted for additional 48 hours. After the reaction solution was cooled down, the resulting product was precipitated with water, washed, and dried to obtain 36.32 g white powder, yield 83%, $T_g=70°$ C.

The resulting product was analyzed by infrared spectrum analysis, which shows the characteristic peaks corresponding to hydroxyl and amino group appearing at 3550 to 3250 cm$^{-1}$; the isocyanate peak at 2275 cm$^{-1}$ disappeared; and the characteristic peaks corresponding to urethane appearing at 1715 cm$^{-1}$ and 1650 cm$^{-1}$.

The hydroxyl value of the resulting product, as determined with sodium hydroxide-ethanol standard solution by the back titration method, is 450 mg KOH/g, and the theoretically calculated value is 461 mg KOH/g.

The yield and the color of each of the resulting products from the reactions at different temperatures for different times are listed in Table 1.

TABLE 1

| Reaction Temperature(° C.) | Reaction Time(hrs) | Yield(%) | Product Color |
|---|---|---|---|
| 50 | 60 | 62 | White |
| 70 | 48 | 83 | White |
| 90 | 30 | 74 | Yellow |

As seen from the above analysis, the products of this example are hydroxy-terminated hyperbranched polyurethane. Other polyhydroxy hyperbranched polyurethanes can also be obtained by substituting other polyhydroxyamines for the trihydroxymethylaminomethane in this example, or by substituting hexamethylene diisocyanate, diphenylmethylene diisocyanate, or isophorone diisocyanate for the tolylene diisocyanate.

EXAMPLE 2

Preparation of Semi-Crystalline Hyperbranched Intermediate with Polyhydroxy Hyperbranched Polyurethane To a same reaction vessel as used in Example 1 were added 15 g (0.12 mol OH) of the hydroxy-terminated hyperbranched polyurethane prepared in Example 1, 11.5 g (0.04 mol) stearic acid, 75 ml N,N-dimethyl acetamide and 2.1 g p-toluene sulfonic acid. The reaction was heated to 120° C. for 5 hours, then for 3 hours under vacuum. After the reaction solution was cooled down, it was precipitated with water, washed and dried to obtain 24.5 g white powder; yield 95%, $T_g=63°$ C., and m.p.=118° C.

The resulting product was analyzed by infrared spectrum analysis, which shows the characteristic peaks corresponding to hydroxyl and amino group appearing at 3550 to 3250 cm$^{-1}$; the characteristic peaks corresponding to urethane appearing at 1715 cm$^{-1}$ and 1650 cm$^{-1}$, and the characteristic peak corresponding to the methylene in the long carbon chain appearing at 716 cm$^{-1}$.

The resulting product was analyzed by a D/MAX-YA anode X-ray diffractometer, and an obvious amorphous region and an obvious crystalline peak at 2θ of between 2° and 20° were observed in the spectrogram.

The acid value of the resulting product, as determined with sodium hydroxide-ethanol standard solution by the direct titration method, is 3 mg KOH/g.

The hydroxyl value of the resulting product, as determined with sodium hydroxide-ethanol standard solution by the back titration method, is 165 mg KOH/g, and the theoretically calculated value is 171 mg KOH/g.

The yield and the color of each of the resulting products from the reactions at different temperatures and different times are listed in Table 2.

TABLE 2

| Reaction Temperature(° C.) | Catalyst(wt %) | Reaction Time(hrs) | Yield (%) | Product Color |
|---|---|---|---|---|
| 100 | 0.5 | 12 | 85 | Pale yellow |
| 120 | 2 | 8 | 95 | White |
| 140 | 1 | 6 | 92 | Brown yellow |

As seen from the above analysis, the products of this example are hydroxy-terminated semi-crystalline hyperbranched polyurethane. Other semi-crystalline hyperbranched polyurethane can also be obtained by substituting monoacyl chloride or monoisocyanate for the monocarboxylic acid of this example.

EXAMPLE 3

Preparation of Acrylated Semi-Crystalline Hyperbranched Polyurethane Oligomer by Modification of Semi-Crystalline Hyperbranched Polyurethane Intermediate with Acrylic Acid To a 100 ml four-neck reaction flask, equipped with a magnetic stirrer, an oil bath, a nitrogen inlet, a condenser tube and a water trap, were added 10 g (0.03 mol OH) of the hyperbranched polyurethane intermediate synthesized in Example 2, 3.24 g (0.045 mol) acrylic acid, 25 mg p-hydroxyanisole, 1.06 g p-toluene sulfonic acid and 40 ml toluene. The reaction was conducted at 110° C. for 5 hours, neutralized to a neutral pH with aqueous sodium bicarbonate, precipitated, washed, and dried to obtain 11.4 g pale yellow powder, yield 86%.

The resulting product was analyzed by infrared spectrum analysis, which shows the characteristic peak corresponding to hydroxyl at 3318 cm$^{-1}$ disappearing; and the characteristic peaks corresponding to the C=C bond of acrylate group appearing at 1640 cm$^{-1}$, 1445 cm$^{-1}$, and 810 cm$^{-1}$.

The resulting product was analyzed by a D/MAX-YA anode X-ray diffractometer, and an obvious amorphous region and an obvious crystalline peak at 2θ of between 2° and 20° were observed in the spectrogram.

The double bond value of the resulting product determined by the bromide oxidation method is 2.45 mmol/g, and the theoretically calculated value is 2.58 mmol/g.

The yield and the color of each of the resulting products from the reactions at different temperatures and different times are listed in Table 3.

TABLE 3

| Reaction Temperature(° C.) | Reaction Time(hrs) | Yield(%) | Product Color |
|---|---|---|---|
| 100 | 8 | 88 | Light yellow |
| 110 | 5 | 86 | Slight yellow |
| 130 | 4 | 90 | Light yellow |

As seen from the above analysis, the products of this example are radiation-curable semi-crystalline polyurethane oligomer, an ideal schematic diagram of which is shown in FIG. 1.

EXAMPLE 4

Preparation of Hyperbranched Polyurethane Oligomer by Modification of Semi-Crystalline Hyperbranched Polyurethane Intermediate with Unsaturated Isocyanate Produced by the Reaction of Tolylene Diisocyanate and β-hydroxyethyl Acrylate To a 100 ml four-neck reaction flask, equipped with a magnetic stirrer, an oil bath, a nitrogen inlet, a condenser tube and a water trap, was added 5.16 g (0.03 mol) tolylene diisocyanate. 3.48 g (0.03 mol) β-hydroxyethyl acrylate was added dropwise with stirring, and the temperature was controlled below 30° C. until the addition of β-hydroxyethyl acrylate was finished. The reaction was conducted until a hydroxyl value of less than 10 mg KOH/g was achieved, obtaining an acrylate containing an isocyanate group. The product was cooled to below 30° C., 0.36 g dibutyl tin laurate was added, and then 10 g (0.03 mol OH) of the hydroxy-terminated semi-crystalline hyperbranched polyurethane intermediate from Example 2 dissolved in N,N-dimethyl acetamide was added dropwise to the reaction vessel through a dropping funnel. After the addition, the reaction was heated to 70° C. for 10 hours. The reaction solution was cooled down, then precipitated with water, washed, and dried to obtain 17.7 g white powder. The yield was 95%.

The double bond value of the resulting product determined by the bromide oxidation method is 1.61 mmol/g, and the theoretically calculated value is 1.56 mmol/g.

The yield and the color of each of the resulting products from the reactions at different temperatures and different times are listed in Table 4.

TABLE 4

| Reaction Temperature(° C.) | Catalyst(wt %) | Reaction Time(hrs) | Yield (%) | Product Color |
|---|---|---|---|---|
| 50 | 3 | 14 | 86 | Yellow |
| 70 | 2 | 10 | 95 | White |
| 90 | 1 | 8 | 90 | Brown yellow |

EXAMPLE 5

Crystalline Property Test of the Acrylated Semi-Crystalline Hyperbranched Polyurethane The melting point and the glass transition temperature of the semi-crystalline hyperbranched polyurethanes prepared in Example 3 and Example 4 were determined by a Differential Scanning Calorimetry, Shimadzu DSC-50. The results are shown in Table 5:

TABLE 5

| Sample | Melting Point(° C.) | Glass Transition Temperature(° C.) |
|---|---|---|
| Sample of Example 3 | 110 | 48.5 |
| Sample of Example 4 | 121 | 54 |

As seen from Table 5, the semi-crystalline hyperbranched polyurethanes prepared in Example 3 and Example 4 have lower melting points and higher glass transition temperatures; the lower melting points make them suitable for thermal-sensitive material such as wood, plastic, and medium density board; while the higher glass transition temperatures make them easier for storage and transport.

EXAMPLE 6

Radiation-Curing of the Acrylated Semi-Crystalline Hyperbranched Polyurethane 5 g of the above prepared acrylated semi-crystalline hyperbranched polyurethane and 200 mg (4 wt %) of a photoinitiator, 1-hydroxycyclohexyl acetophenone (Darocur 184) were uniformly mixed, and coated on a glass plate that was heated to 120° C. with a coater to form a thin film with a thickness of about 100 microns. Then the film was heated and levelled for 5 minutes. Subsequently, the sample was irradiated by a 1000 W medium pressure ultraviolet (UV) lamp from Lantian BEIJING at a distance of 10 cm from the lamp for 4, 8, 12, 16, and 20 seconds, respectively. The double bond conversion rates at different times are listed in Table 6.

TABLE 6

| | | Irradiation Time (seconds) | | | | |
|---|---|---|---|---|---|---|
| | | 4 | 8 | 12 | 16 | 20 |
| Sample of Example 3 | Double bond conversion rate/UV(%) | 75.0 | 80.3 | 82.6 | 84.6 | 85.1 |

As can be seen from Table 6, the inventive material can be cured rapidly to form a film by ultraviolet irradiation, so as to effectively improve production efficiency and save energy, which makes it suitable for large-scale production in industry.

EXAMPLE 7

Radiation-Curing of the Acrylated Semi-Crystalline Hyperbranched Polyurethane and Properties of the Cured Film 5 g of the above prepared acrylated semi-crystalline hyperbranched polyurethane and 200 mg (4 wt %) of a photo-initiator, 1-hydroxycyclohexyl acetophenone (Darocur 184), were uniformly mixed, and coated on a glass plate that was heated to 120° C. with a coater to form a thin film with a thickness of about 75 microns. Then the film was heated and levelled for 5 minutes. Subsequently, the samples were irradiated by a 1000 W medium pressure ultraviolet (UV) lamp from Lantian BEIJING at a distance of 10 cm from the lamp for 4, 8, 12, 16, and 20 seconds, respectively. The pendulum hardness of the cured film was determined by a QBY-type Pendulum Sclerometer manufactured by TIANJIN Instrument Plant. The results are shown in Table 7.

TABLE 7

| | | Irradiation Time (seconds) | | | | |
|---|---|---|---|---|---|---|
| | | 4 | 8 | 12 | 16 | 20 |
| Sample of Example 3 | Pendulum hardness (seconds) | 260 | 300 | 320 | 326 | 330 |
| Sample of Example 4 | Pendulum hardness (seconds) | 275 | 305 | 330 | 336 | 340 |

As can be seen from Table 7, after the inventive material was rapidly cured to form a film by ultraviolet irradiation, the resulting cured film had a certain hardness, which meets the demands of the industrial application.

EXAMPLE 8

Thermal Stability of the Cured Film of the Acrylated Semi-Crystalline Hyperbranched Polyurethane The thermal stability of the two cured films which were subjected to the above-mentioned pendulum hardness test with an irradiation time of 20 seconds was evaluated by a Thermogravimetric Analyzer Shimadzu TGA-50H, and the results are shown in Table 8 and Table 9:

TABLE 8

| Sample of Example 3 | Temperature (° C.) | 220.5 | 375.3 | 510.1 |
|---|---|---|---|---|
| | Weight loss(%) | Start | −65.3 | −90.3 |

TABLE 9

| Sample of Example 4 | Temperature (° C.) | 200.5 | 355.3 | 495.2 |
|---|---|---|---|---|
| | Weight loss(%) | Start | −70.4 | −93.0 |

As can be seen from the results listed in Table 8 and Table 9, after the inventive acrylated semi-crystalline hyperbranched polyurethane oligomer was cured to form a film, the resulting cured film had a good thermal stability, which meets the demands of the industrial application.

We claim:

1. A method for preparing an acrylated semi-crystalline hyperbranched polyurethane oligomer, comprising forming a hydroxy-terminated hyperbranched polyurethane, and modifying the hydroxy-terminated hyperbranched polyurethane in a two-step process, wherein the two-step process includes the following steps:

forming a long carbon chain with a carbon atom number higher than 10 or a benzene ring or a naphthalene ring at a portion of the terminal hydroxyl groups of the hydroxy-terminated hyperbranched polyurethane to obtain a semi-crystalline hyperbranched intermediate possessing residual terminal hydroxyl groups, and making a modification to the residual terminal hydroxyl groups of the hydroxy-terminated hyperbranched polyurethane with methacrylic and/or acrylic double bonds to form an acrylated semi-crystalline hyperbranched polyurethane oligomer.

2. The method according to claim 1, wherein the two-step process includes the first step of dissolving the hydroxy-terminated hyperbranched polyurethane in a solvent, adding with stirring, a compound (I) containing a functional group reactive with a portion of the terminal hydroxyl groups of the hydroxyl-terminated hyperbranched polyurethane and a long carbon chain having a carbon atom number higher than 10 or a benzene ring or a naphthalene ring in a certain proportion, wherein said certain proportion refers to the molar reaction ratio of the compound (I) with a long carbon chain or a benzene ring or a naphthalene ring to the terminal hydroxyl groups of the hydroxy-terminated hyperbranched polyurethane, and is presented by the value X meeting the inequation $0<x<1$, and reacting the hydroxy-terminated hyperbranched polyurethane with the compound (I) at a temperature ranging from about 30° C. to about 120° C. for about 8 hours to about 48 hours in the presence of a catalyst to provide a polyurethane intermediate having residual hydroxyl terminal groups; and the second step of dissolving the intermediate in a solvent, adding dropwisely, with stirring an unsaturated capping compound (II) containing a functional group reactive with hydroxyl in a molar amount equivalent to that of the terminal hydroxyl groups of the intermediate formed from the first reaction step, reacting the intermediate and the compound (II) at a temperature ranging from about 30° C. to about 120° C. for about 2 hours to about 20 hours in the presence of a catalyst and a polymerization inhibitor, and then washing with water to remove by-products.

3. The method according to claim 2, wherein the compound (I) containing a functional group reactive with hydroxyl and a long carbon chain with a carbon atom number higher than 10 or a benzene ring or a naphthalene ring includes monoacyl chloride, monoisocyanate, or monocarboxylic acid.

4. The method according to claim 3, wherein the chemical formula of the monoacyl chloride is RCOCl, wherein R is an alkyl containing more than 10 carbons or phenyl or naphthyl; the chemical formula of the monoisocyanate is RNCO, wherein R is an alkyl containing more than 10 carbons or phenyl or naphthyl; and the chemical formula of the monocarboxylic acid is RCOOH, wherein R is an alkyl containing more than 10 carbons or phenyl or naphthyl.

5. The method according to claim 4, wherein the monoacyl chloride includes undecanoyl chloride, dodecanoyl chloride, tetradecanoyl chloride, hexadecanoyl chloride, or benzoyl chloride; the monoisocyanate includes undecyl isocyanate, dodecyl isocyanate, tetradecyl isocyanate, hexadecyl isocyanate, octadecyl isocyanate, or phenyl isocyanate; and the monocarboxylic acid includes undecanoic acid, palmitic acid, stearic acid, or benzoic acid.

6. The method according to claim 2, wherein the unsaturated compound (II) containing a functional group reactive with hydroxyl includes acrylic anhydride, methacrylic anhydride; acrylic acid, methacrylic acid; acryloyl chloride or methacryloyl chloride.

7. The method according to claim 1, wherein the method for forming the hydroxy-terminated hyperbranched polyurethane includes the following steps:
dissolving a polyhydroxyamine monomer in a solvent,
adding a difunctional isocyanate monomer at a temperature ranging from about −5° C. to about 10° C. to provide a first reaction mixture,
maintaining the temperature of the first reaction mixture at about −5° C. to about 10° C. for about 1 hour to about 15 hours,
adding a catalyst to provide a second reaction mixture,
heating the second reaction mixture at a temperature ranging from about 50° C. to about 90° C. for about 12 hours to about 48 hours, and
the resulting reaction being precipitated, filtered, and dried to provide the hydroxy-terminated hyperbranched polyurethane.

8. The method according to claim 7, wherein the polyhydroxyamine includes diethanolamine, dipropanolamine, dibutanolamine, dipentanolamine, N,N-dihydroxyphenethyl-3-amine, dihydroxymethylaminoethane, trihydroxymethylaminomethane, or N-methyl-d-glucosamine.

9. The method according to claim 7, wherein the difunctional isocyanate monomer includes tolylene diisocyanate, hexamethylene diisocyanate, diphenylmethylene diisocyanate, or isophorone diisocyanate.

10. The method according to claim 2 or 7, wherein the solvent includes dimethyl sulfoxide, N,N-dimethylformamide, N,N-dimethyl acetamide, toluene, dioxane, ethyl acetate, N-methylpyrrolidinone, butanone, xylene, or tetrahydrofuran.

11. An acrylated semi-crystalline hyperbranched polyurethane oligomer obtained by the method according to claim 1, characterized in that the acrylated semi-crystalline hyperbranched polyurethane oligomer has a methacrylic and/or acrylic double bond at a portion of the terminals and a long carbon chain with a carbon atom number higher than 10 or a benzene ring or a naphthalene ring at the residual terminals.

* * * * *